United States Patent [19]

Binder et al.

[11] Patent Number: 4,488,217
[45] Date of Patent: Dec. 11, 1984

[54] DATA PROCESSING SYSTEM WITH LOCK-UNLOCK INSTRUCTION FACILITY

[75] Inventors: Paul Binder, Tyngsboro; David A. Cane, Sudbury, both of Mass.

[73] Assignee: Digital Equipment Corporation, Maynard, Mass.

[21] Appl. No.: 265,173

[22] Filed: May 19, 1981

Related U.S. Application Data

[63] Continuation of Ser. No. 019,350, Mar. 12, 1979, abandoned.

[51] Int. Cl.³ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,348,210 | 10/1967 | Ochsner | 364/200 |
| 3,469,239 | 9/1969 | Richmond et al. | 364/200 |
| 3,528,061 | 9/1970 | Zurcher, Jr. | 364/200 |
| 3,805,247 | 4/1974 | Zucker et al. | 364/200 |
| 3,889,237 | 6/1975 | Alferness et al. | 364/200 |
| 4,000,485 | 12/1976 | Barlow et al. | 364/200 |
| 4,037,210 | 7/1977 | Sharp | 364/200 |
| 4,096,561 | 6/1978 | Trinchieri | 364/200 |
| 4,136,386 | 1/1979 | Annunziata et al. | 364/200 |
| 4,162,529 | 7/1979 | Suzuki et al. | 364/200 |
| 4,189,771 | 2/1980 | Roever | 364/200 |

OTHER PUBLICATIONS

"A Systematic approach to the design of digital bussing Structure", written by Thurber et al., Fall Joint Corp. Conf. 1972, pp. 719–740.
Vax 11/780, DW 780 Unibus Adapter Tech. Description Manual, Published by Digital Equipment Corp. 1978, pp. 2-27, and 2-30.
Madnick/Donovan, *Operating Systems*, 1974, McGraw-Hill Inc. pp. 251-267.
Donovan, *System Programming*, 1972, McGraw-Hill Inc., pp. 395-400.

*Primary Examiner*—Eddie P. Chan
*Attorney, Agent, or Firm*—Cesari and McKenna

[57] ABSTRACT

A data processing system including a plurality of data units and a common bus. The data unit includes apparatus for issuing instructions including a LOCK instruction and an UNLOCK instruction. Each data unit includes apparatus responsive to the instructions such that, if the first data unit issues a LOCK instruction, the data unit other than the first data unit, are prevented from transferring information over the common bus with a LOCK instruction until an UNLOCK instruction is issued by any data unit.

4 Claims, 9 Drawing Figures

DATA PROCESSING SYSTEM WITH LOCK-UNLOCK INSTRUCTION FACILITY

This is a continuation of application Ser. No. 019,350 filed Mar. 12, 1979 now abandoned.

BACKGROUND OF THE INVENTION

1. Field of the Invention

This invention generally relates to data processing systems and more specifically to apparatus for interconnecting the various units comprising the system.

2. Description of the Prior Art

A digital data processing system generally comprises three basic elements: a memory unit, an input/output element and a processor element. The memory element stores information in addressable storage locations. This information includes both data and instructions for processing the data. The processor element causes information to be transferred between it and the memory element, interprets the incoming information as either data or instructions and processes the data in accordance with the instructions. The input/output elements also communicate with the memory element in order to transfer input information to the system and to obtain processed information from it.

Over the years, as the demands for computing power and speed have increased, it has been suggested and is known to use several processor elements in a single processing system. In such multi-processing systems, it is normally desirable that each of the processors have partial or complete access to the same memory elements and input/output elements. It is therefore necessary to provide means to prevent the processors from accessing the same element simultaneously. Several arrangements for this are known. In a first arrangement, the processing elements are assigned priority levels whereby processing units having a higher priority are permitted to access the memory elements and input output elements over processing units having lower priority. This inevitably slows the turnaround for programs being run on the units having lesser priority.

A second arrangement is to provide a computer network including a master computer system to arbitrate between a plurality of slave processors. This arbitration may be determined by such factors as the length of time a slave processor would have to access the memory element or the input/output element, the length of time since its last access, or the like. However, if the master system malfunctions, the slaves are prevented from accessing the memory or input/output elements until a master system is repaired. Furthermore, the master system may create a bottleneck if the requests for access to the memory or input/output elements are too rapid for the master system to arbitrate, slowing the slave processors.

In a third arrangement an interaction control unit may be connected between the processing units and the memory units and input/output units to control access between the processing units and the memory units and the input/output units. The interaction control unit does not prevent the processing units themselves from operating while they are waiting to access the memory units and input/output elements. This arrangement otherwise has the same problems as the master-slave processing arrangement discussed above.

Furthermore, as the increase in demands for computing power have increased, more and more control information has to be passed among the various elements of the system. This has required addition of a number of control lines among the elements, adding to the expense both for the control lines themselves and for the additional electronic circuitry required to interpret information on the lines and place information on the lines.

SUMMARY OF THE INVENTION

It is an object of this invention to provide a multiprocessor data processing system in which the various central processing units are prevented from simultaneously accessing the memory elements and the input output elements simultaneously.

It is another object of the invention to provide a multi-processing data processing system in which the multiple processors are prevented from accessing the other elements of the system without the use of a preassigned priority, or a master unit or interphase.

In accordance with this invention, a data processing system is provided in which all connections between the various elements are made on a single bus. The bus includes lines for arbitration, for information transfer and for control. The information transfer portion of the various elements includes apparatus for issuing a command for a locking operation which is received by other processors in the system. This command prevents the other processors from issuing the same type of locking command until an unlocking command is issued. Any processor can issue such an unlocking command.

In conjunction with this apparatus, only one line is required to be driven to indicate that the information transfer buses are in use instead of the usual plurality of lines between the various elements.

The invention is pointed out with particularity in the impending claims. The above and further objects and advantages of the invention may be better understood by referring to the following description taken in conjunction with the accompanying drawings.

DESCRIPTION OF AN ILLUSTRATIVE EMBODIMENT

Figure 1:
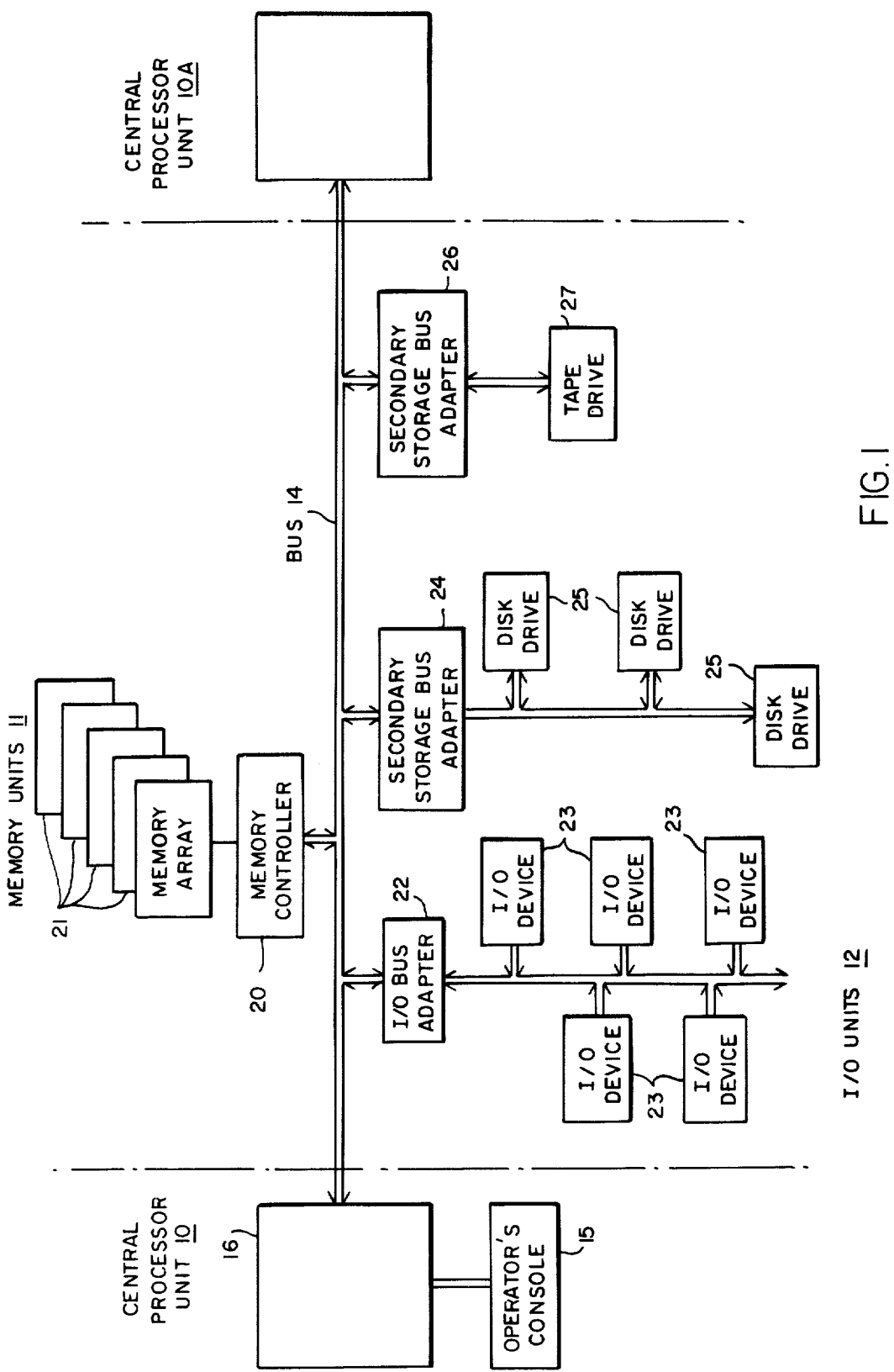
FIG. 1 is a block diagram of a digital data processing system constructed in accordance with this invention.

As exemplified in FIG. 1, the basic elements of a data processing system, in particular a multi-processor system, comprises a first central processor unit 10, a second central processor unit 10A, memory units 11, and input/output (I/O) units 12. A bus 14 interconnects the central processor units 10 and 10A, memory unit 11 and I/O units 12. More than two central processor units may be connected to bus 14 in a multi-processor environment. These would be connected to bus 14 in the manner similar to processor units 10 and 10A.

The central processor unit 10 comprises an operator's console 15, a bus interface and other conventional circuits normally provided in the central processor unit. Central processor unit 10A, and other central processor units that may be attached to bus 14, may be similar to central processor unit 10; however, all that is necessary is that the central processor units have the capability to interface to bus 14. Interface circuit 16 receives all data from the memory and performs all transactions for the other circuitry in central processor unit 10.

The operator's console 15 serves as the operator interface. It allows the operator to examine and deposit data, halt the operation of the central processor unit 10 or step it through a sequence of program instructions. It also enables an operator to initalize the system through a bootstrap procedure and perform various diagnostic tests on the entire data processing system. Central processor unit 10A generally will include an operator's console (not shown).

In FIG. 1, the memory unit 11 includes a memory controller 20 which connects to a plurality of memory arrays 21. The operation of memory unit 11 is similar to that disclosed in U.S. patent application Ser. No. 954,601, filed Oct. 10, 1978.

Several types of I/O units 12 are shown. An I/O bus adapter 22 interconnects several input/output devices 23, such as, for example, teletypewriters or cathode ray tubes to the bus 14. The interconnection operation and transfer signals between the I/O bus adapter 22 and the I/O devices is disclosed in part in U.S. Pat. No. 2,710,324.

The two other I/O units 12 shown in FIG. 1 provide a secondary storage facility for the data processing system. They include a secondary storage bus adapter 24 and a plurality of disk drives 25. There is also shown a second secondary storage bus adapter 26 and a tape drive 27. The interconnection of the secondary storage bus adapters 24 and 26 and their respective disk drives 25 and tape drive 27 is disclosed in U.S. Pat. No. 3,999,163.

The bus interconnects the various units or elements of a data processing system. Prior to describing the transfer of information between different pairs of the units connected to the bus, it will be helpful first to establish some definitions for terms that have already been used and that will be used throughout the remainder of this description.

"Information" is intelligence used to control and provide the basis for data processing. It includes data and address, instruction and status information. "Data" includes information which is the object of or the result of processing.

Figure 2A:
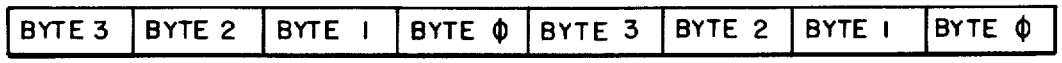
FIGS. 2A through 2C pictorially depict data types that are utilized in conjunction with a specific embodiment of the invention.
Figure 2B:
Figure 2C:

Transfers of information between the units in the data processing system shown in FIG. 1 occur over the bus 14 and involve transfers of discrete information items. Each information item has a characteristic size on bus 14. Other elements may process information items having other sizes. The most elementary information item is the byte. In one specific embodiment to the data processing system shown in FIG. 1, the byte includes eight binary digits (or bits). FIG. 2A depicts eight contiguous bytes. The next larger data item size is a "word", as shown in FIG. 2B. A word comprises two contiguous bytes. Two contiguous words constitute a "long word", as shown in FIG. 2C.

The bus 14 can transfer all information in parallel as a longword. In the two contiguous longwords shown in FIG. 2A, byte 0 is the least significant byte position for each longword. Word 0 and long word 0 are the least significant word and long word position in FIGS. 2B and 2C respectively. The following discussion assumes that corresponding alignments are maintained within the data processing system; however, there is no requirement that any such alignments be maintained.

If two elements are to exchange information over the bus 14 at least two "bus transactions" are necessary. During a first bus transaction, one element requests the information exchange and transmits command and address information on the bus 14. The other element, designated by the address information, responds and prepares to complete the information exchange. This completes a first bus transaction. During the second bus transaction, the information to be exchanged passes over the bus 14.

Each element that connects to the bus 14 is called a nexus. The specific system shown in FIG. 1 includes 6 nexuses. A nexus is further defined in terms of its function during an exchange of informtion. During such an exchange, the nexus that transmits command and address information on to the bus 14 is called a "master nexus" 30A in FIG. 3. The unit which responds to that command and address information is called a "slave nexus" 30B. Thus, if a central processor unit needs to retrieve data from the memory controller 20, the central processor unit becomes a master nexus and transmits a READ (or READ LOCK) command and memory address during a first bus transaction. Memory controller 20 becomes a slave nexus when it receives and accepts the command and address information from the bus 14.

A nexus is also defined as a transmitting or receiving nexus. A transmitting nexus drives the signal lines while the receiving nexus samples and examines the signal lines during each bus transaction. In the foregoing example, the central processor unit is a transmitting nexus during the first bus transaction and a receiving nexus during the second bus transaction. Similarly, the memory controller 20 is a receiving nexus during the first bus transaction and is transmitting nexus during the second bus transactions. Similar transactions occur for information exchanges between any two nexuses. However, the memory controllers normally function only as slave nexuses while central processor units normally function only as master nexuses.

In accordance with the specific embodiment of this invention described in this application, the bus 14 conveys a number of signals to and from the various units that connect to it over corresponding conductors. These conductors and signals can be listed in three general classes:

1. arbitration, over arbitratiion bus line 31;
2. information transfer, over the data/address bus lines 32 and 33; and
3. control, over control bus lines 34–38.

Lines 31–38 comprise bus 14. The data address bus or information transfer bus includes information lines 32 and function lines 33. Instructions are sent over function lines 33.

The control conductors and signals include a STATUS line 34, a HOLD line 35, a WAIT line 36, a DBBZ line 37 and a CLOCK line 38. STATUS information indicates whether the addressed memory location has the requested information and whether the information is valid. The HOLD signal, when inserted on the HOLD line 35, prevents any of the nexuses from getting control of the data/address bus. Hold signals may be used, for example, to allow certain memories to control the rate at which write transactions occur.

The WAIT signal asserted on the WAIT line 36, is involved in interupt transactions. The DBBZ signal, or data/address bus busy signal when asserted on the DBBZ line 37, indicates when a nexus is requesting information or transmitting information over the data/address bus.

A number of instructions may be sent over the function lines 33, including READ, READ LOCK, WRITE and WRITE UNLOCK. When a nexus issues a READ instruction, it desires to read the contents of a location in memory whose address is transmitted over information transfer lines 32. A READ LOCK instruction indicates that the commanding nexus desires to read the addressed location in memory and prevent other nexuses from gaining access to the bus with their own READ LOCK instructions until a WRITE UNLOCK instruction is placed on the function bus. The READ LOCK instruction does not prevent another master nexus from issuing a READ or WRITE instruction. The READ LOCK command is used primarily to prevent other processors or nexuses from gaining access to a memory which may have invalid information in the memory or to read possibly invalid information. This is possible if the processor that originally issued the READ LOCK instruction has access to the memory and may be modifying information held in memory at the same time the other processor may be attempting to read from the same memory. To prevent this, the first processor will issue a READ LOCK instruction to insure that other nexuses are prevented from gaining access to memory.

Figure 4:
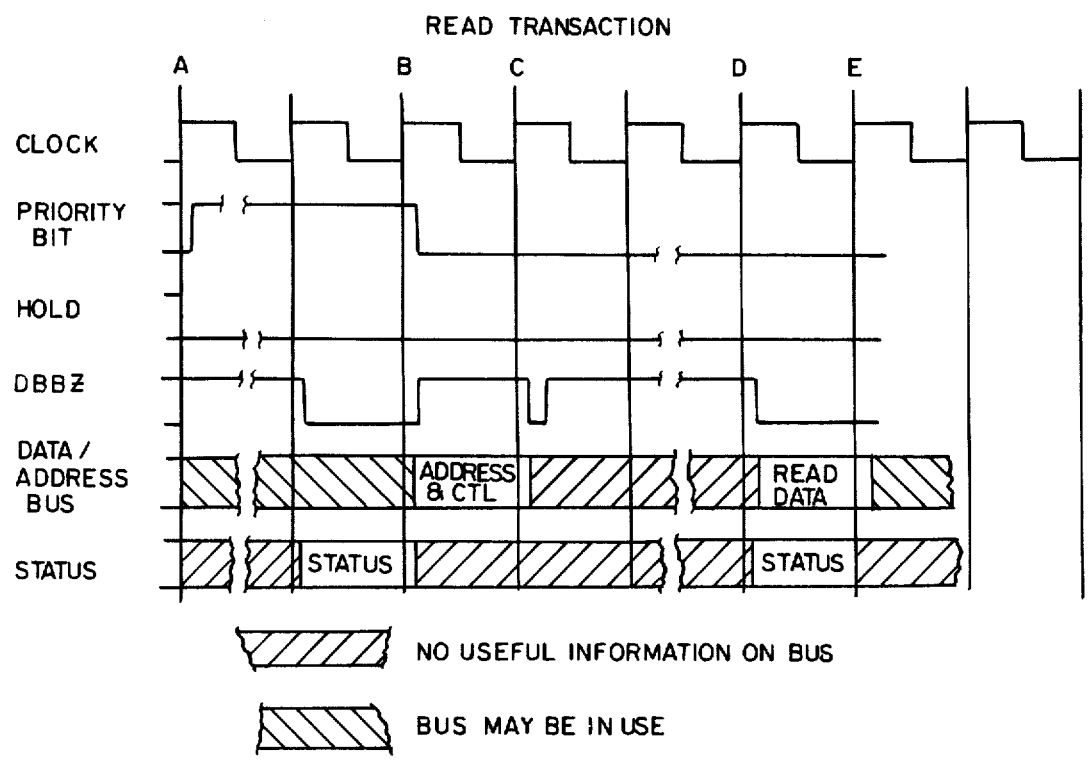
FIG. 4 is a diagram depicting the sequence for a read transaction that can occur between nexuses shown on FIG. 3.
Figure 5:
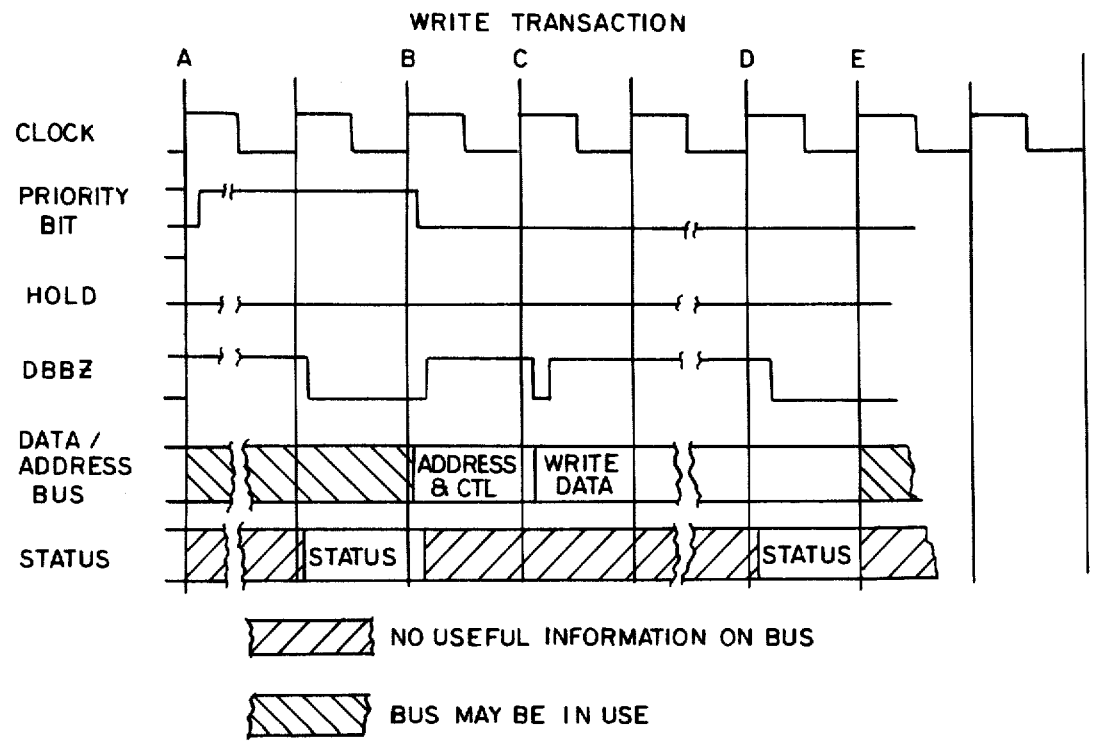
FIG. 5 is a diagram that depicts sequences of operations for a write transaction that can occur between the nexuses shown in FIG. 3.

As mentioned above, two bus transactions are required for each READ transaction and for each WRITE transaction. FIGS. 4 and 5, respectively, exemplify, for the illustrative embodiment disclosed in this application, the transactions for a READ and the transactions for a WRITE. In FIGS. 4 and 5, the positive assertive signals are shown true, or asserted, when at a high level for purposes of simplifying the explanation. Ground assertion (i.e., asserted or true when low) circuits and signals normally implement this logic. However, the conversion between positive and ground assertion logic, based upon de Morgan's theorem, is well known to those skilled in the art.

Figure 3:
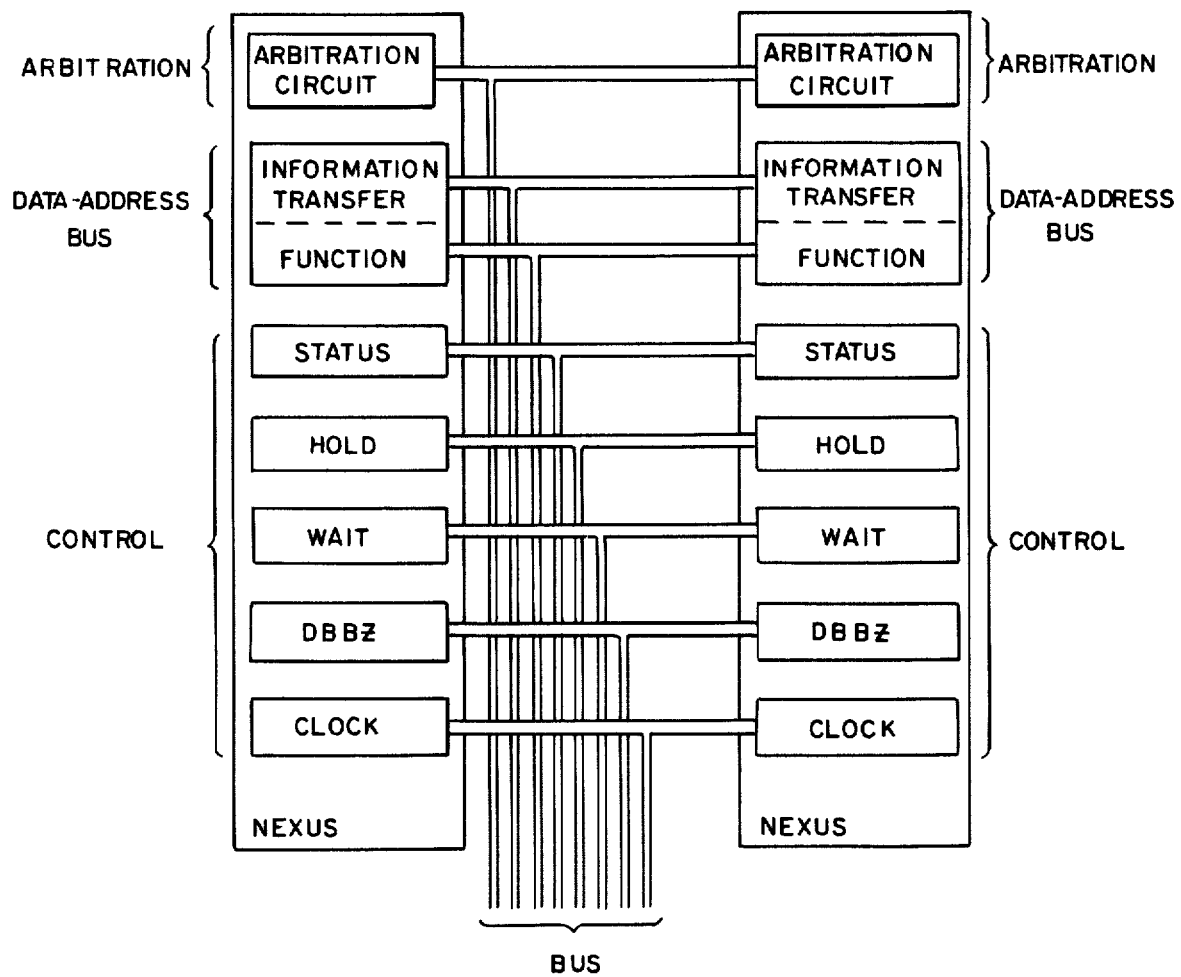
FIG. 3 illustrates the lines and corresponding signals that constitute an interconnection of nexuses in the digital data processing system in FIG. 1.

FIG. 4 exemplifies a READ transaction between two nexuses shown in FIG. 3. The CLOCK pulses identify and delimit the various bus cycles, a new bus cycle starting on the leading edge of each positive-going pulse. If the master nexus desires the use of the bus to read from a slave nexus such as memory, the master will assert its priority signal on the arbitration bus 31. If its priority is the highest, and if the HOLD and DBBZ lines are all at non-asserted levels, the master will obtain control of bus 14 by asserting DBBZ as shown at time B on FIG. 4. The master asserts DBBZ for one cycle and simultaneously transmit address and control information on the data/address bus 32 and 33. The master will then shift the DBBZ signal to a non-asserted level.

The addressed slave then asserts DBBZ as shown from time C to time D. No other nexus can obtain control of the bus while the slave is asserting DBBZ. When the slave is ready to transmit information to the master, the slave shifts DBBZ to a non-asserted level, and a shown from time D to time E, transmits the information on the data/address bus, and simultaneously returns STATUS information on the STATUS line 34.

Since the DBBZ line is non-asserted after time D, another master may attempt to obtain control of the bus during the cycle beginning at time D. During this cycle it can assert its priority signal and assert the DBBZ line during the cycle beginning at E transmit address and control and begin a new transaction. In this manner, the transactions can overlap by one cycle, thereby reducing the transaction time. In other words, more accesses to memory may be attempted during a given time period than if the bus transactions did not overlap.

This overlapping may be shown in part by the STATUS signal in FIG. 4. The left most STATUS signal, sent during its bus cycle immediately preceeding time B may be, for example, from a previous transaction.

By having both the master and the slave nexus assert DBBZ on the same line, the number of bus lines is reduced. It has been the practice to include a number of BUSY lines indicating the bus is in use. By reducing the number of BUSY lines the total number of lines in the bus and therefore the circuitry required to drive those lines is reduced.

FIG. 5 exemplifies a WRITE transaction. A master desiring to WRITE asserts its priority signal over the arbitration line 31. When the HOLD line and the DBBZ line are both at a non-asserted level and the master's priority is the highest, it obtains control of the DBBZ line and asserts DBBZ. It simultaneously transmits address and control information on the data/address bus for one cycle. The addressed slave than asserts DBBZ and receives the data on the data/address bus. At the beginning of the final cycle, the slave shifts DBBZ to a non-asserted level and transmits STATUS information to the STATUS line 34. The final cycle in this case begins at time D. Since the DBBZ line is low, another master can assert its priority signal and, if the HOLD and WAIT lines are non-asserted, can obtain control of the bus by asserting DBBZ at time E.

Figure 6:
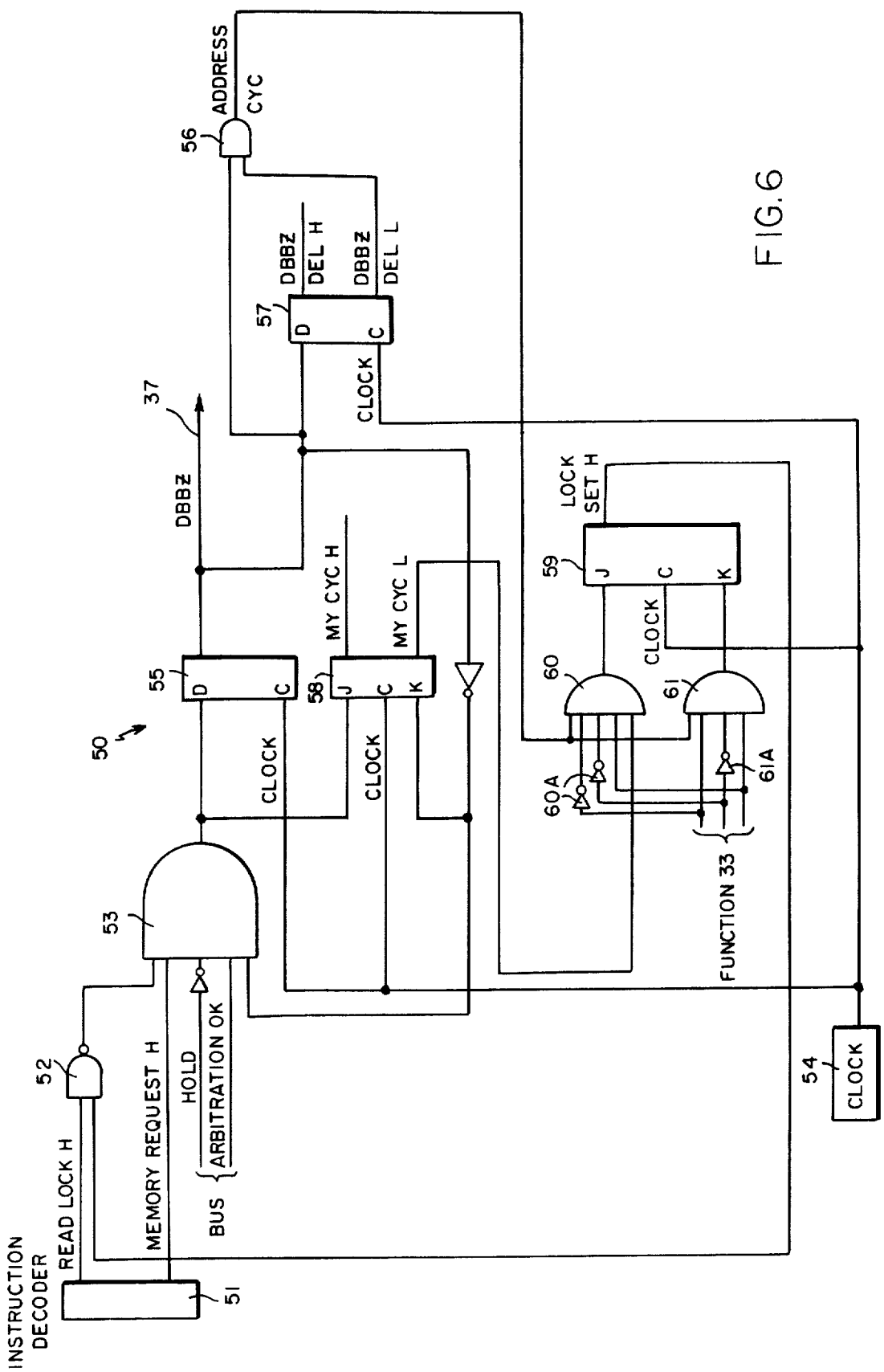
FIG. 6 is a schematic diagram of a portion of the master nexus shown in FIG. 3.
Figure 7:
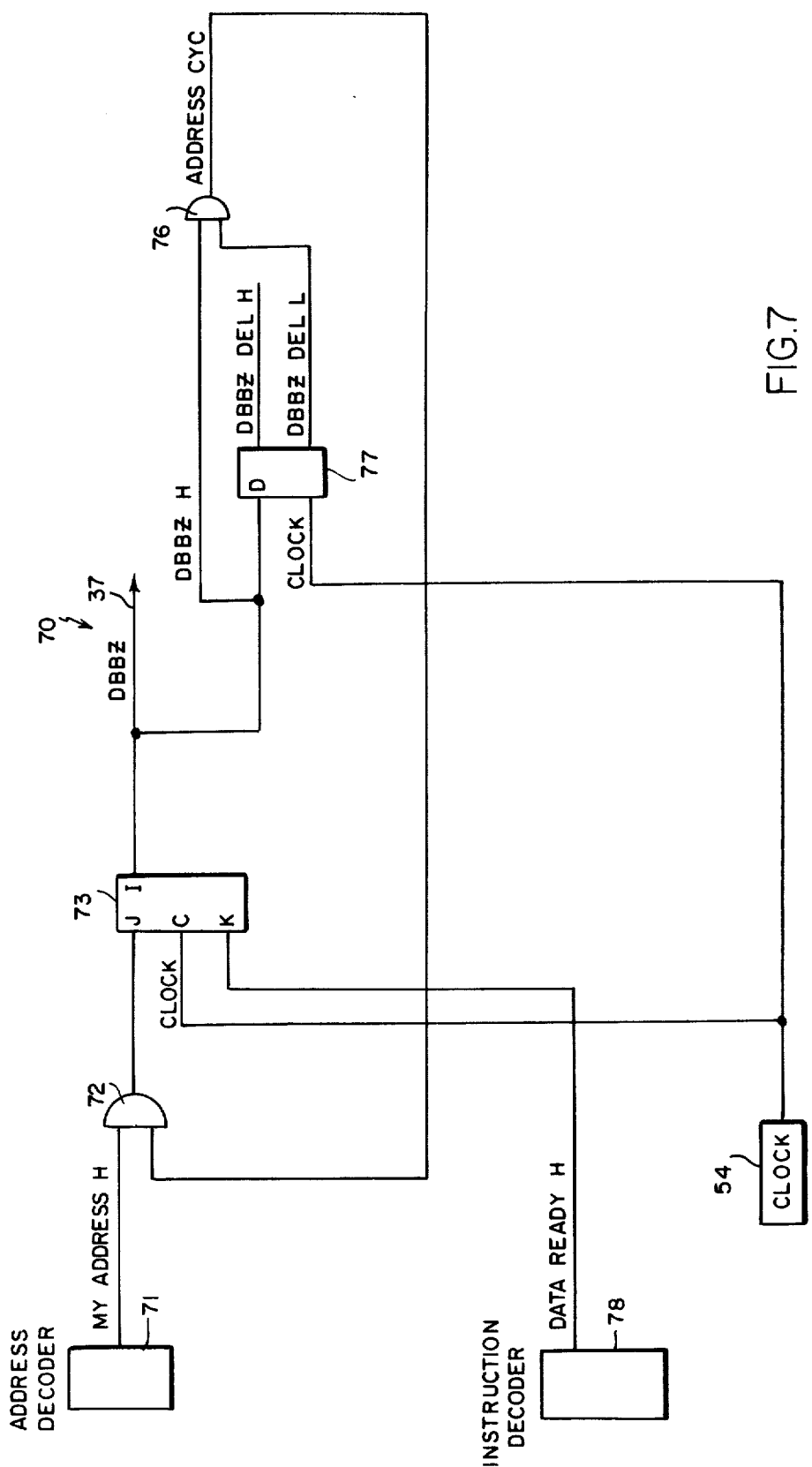
FIG. 7 is a schematic diagram of a portion of a slave nexus shown in FIG. 3.

FIGS. 6 and 7 exemplify respectively master and slave circuitry for shifting the DBBZ line between asserted and non-asserted levels.

The master circuit 50 shown in FIG. 6 also provides means for preventing the master nexus 30A from gaining access to the DBBZ line 37 with a READ LOCK instruction if another master has previously issued a READ LOCK instruction that has not been unlocked by a WRITE UNLOCK instruction.

Master 50 includes an instruction decoder 51 that actuates circuit 50 in response to an instruction such as READ, WRITE, READ LOCK and WRITE UNLOCK. If a READ LOCK instruction is issued, instruction decoder 51 sends one input to NAND gate 52 high and one input to an AND gate 53 high. If, as described hereinafter, the second input to NAND gate 52 is low, the output of NAND gate 52 will be high, and, if the HOLD signal is low (unasserted) if the master's ARBITRATION line is high (indicating that this master has priority), and if the DBBZ line is currently low (unasserted), the output of AND gate 53 will be high. On the next clock pulse from clock 54, the set output of D flip-flop 55 will go high thereby shifting DBBZ line 37 to a high (asserted) level. Inverter 54A then sends the output of AND gate 53 low. At the next clock pulse flip-flop 55 is reset, shifting DBBZ to a non-asserted level. The master, therefore, asserts DBBZ for one cycle, the time between the first two clock pulses.

Circuit 50 includes an AND gate 56 and a flip-flop 57 that identifies the first cycle of a master's bus transaction. Before flip-flop 55 asserts DBBZ, the reset output of flip-flop 57 will be high, as will the one input to AND gate 56. When flip-flop 55 asserts DBBZ, the second input to AND gate 56 goes high, and its output also goes high. On the next clock pulse, the flip-flop 57 is set, sending its reset output low, and sending AND gate 56 low, AND gate 56 is therefore high only during the first cycle, otherwise called the ADDRESS CYCLE.

Circuit 50 includes a JK flip-flop 58 that identifies the bus transaction as being initiated by this particular master. When the output of AND gate 53 goes high on the next clock pulse the set output of JK flip-flop 58 will also go high (and the reset output of flip-flop 58 will go low). By sending the set and reset outputs flip-flop 58 high and low, respectively, the transaction is indicated as having been initiated by this master.

Circuit 50 also includes a second JK flip-flop 59 that identifies when a READ LOCK instruction has been issued on the function bus and when a WRITE UNLOCK instruction has been issued. Flip-flop 59 also identifies when the previous READ LOCK instruction has been issued by this particular master. If this master issued the READ LOCK instruction, it is not prevented from issuing further READ LOCK instruction. Flip-flop 59 accomplishes this as follows. When a READ LOCK instruction is placed on the function bus 33 during an ADDRESS CYCLE, inverters 60A decode the function lines instruction and set the function inputs to AND gate 60 high. The output of AND gate 56 will be high. If the READ LOCK instruction is not being issued by circuit 50, the reset output of flip-flop 58 will be high. The output of AND gate 60 will therefore go high and on the next clock pulse, the set output of JK flip-flop 59 will go high. With the set output high, if a READ LOCK instruction is decoded by instruction decoder 51, NAND gate 52 is driven low, and circuit 50 cannot assert DBBZ. The set output of JK flip-flop 59 remains high until the K input is driven high at a clock pulse. This occurs when a WRITE UNLOCK instruction is issued on the function bus during an address cycle. Inverter 61A decodes this instruction and sends the function inputs to AND gate 61 high. During the ADDRESS CYCLE, the output of AND gate 56 will go high which sends the output of 61 high. This resets flip-flop 59 sending the set output low. The flip-flop remains reset until set again by a READ LOCK instruction. With the set output low, if a READ LOCK instruction is decoded by decoder 51, NAND gate 52 will be high, permitting circuit 50 to assert DBBZ.

If, on the other hand, circuit 50 issues the READ LOCK instruction, the reset output of flip-flop 58 will be low as will the output of AND gate 60. Flip-flop 59 will therefore remains reset and the set output will be low. NAND gate 52 will pass a READ LOCK instruction if the output of flip-flop 59 is low, which can can occur only a previous READ LOCK instruction has been issued by circuit 50, or if the previous READ LOCK instruction had been cancelled by the WRITE UNLOCK instruction.

FIG. 7 exemplifies an implementation for a slave circuit 70 for driving the DBBZ line. When the master sends address information on the data/address bus, the address decoder 71 decodes the address and identifies this slave nexus as being the addressed slave. The address decoder 71 is connected to one input of an AND gate 72. The output of AND gate 72 is connected to the J input on JK flip-flop 73, which drives DBBZ line 37. The DBBZ line 37 in turn is connected to AND gate 76 and the D input on D flip-flop 77. The reset output on flip-flop 77 is connected to the other input on AND gate 76. The output of AND gate 76 is connected to the second input on AND gate 72. Flip-flop 77 identifies the first (address) cycle of the bus transaction in a manner similar to AND gate 56 in the master circuit 50. ADDRESS CYCLE will be asserted for one cycle, after which it will shift to a non-asserted level. When ADDRESS CYCLE is asserted, flip-flop 73 will be asserted, driving DBBZ line 37. During subsequent clock cycles, ADDRESS CYCLE and AND gate 72 will be low, flip-flop 73 will remain asserted, however, until, as explained hereinafter, the information is ready to be sent.

An instruction decoder 78 in the slave nexus identifies when the data is ready to be transmitted along the data-/address bus, the data ready H line would go high, resetting flip-flop 73 and shifting DBBZ line 37 low. This drives the output of AND gate 76 low which in turn drives the output of AND gate 72 low.

Flip-flops 73 and 77 are both clocked by CLOCK 54.

On a WRITE transaction, with reference to FIG. 6, a READ LOCK instruction will not be issued by instruction decoder 51. The READ LOCK line will be low (non-asserted) so the nexus can WRITE whether or not a READ LOCK instruction is on the function bus. The MEMORY REQUEST H line is asserted for a WRITE transaction which drives AND gate 53 high, setting flip-flop 55 driving DBBZ line 37.

The slave on a WRITE transaction asserts DBBZ in a manner similar to a READ transaction. The slave drives DBBZ line 37 until it receives an instruction indicating that the next cycle is the last cycle. The slave's instruction decoder 78 then drives the DATA READY H line high, resetting flip-flop 73. STATUS information is then transmitted by the slave to the master along the STATUS line.

The foregoing description is limited to a specific embodiment of this invention. It will be apparent, however, that this invention can be practiced in data processing systems having diverse basic construction or in systems that use different internal circuitry than is described in the specification with the attainment of some or all of the foregoing objects and advantages of this invention. Therefore it is the object of the appended claims to cover all such variations and modifications which come within the true spirit and scope of this invention.

What we claim as new and desire to secure by Letters Patent of the United States is:

1. A data processing system including a memory, a first and second data means, and a common bus interconnecting said memory and said first and second data means for transferring data and data transfer instruction signals which enable the transfer of data between said memory and said first and second data means over said common bus, said data transfer instruction signals including signals representing a first instruction and signals representing a second instruction, each of said first and second data means including:
(i) data transfer instruction signal transmitting means connected to said data transfer instruction signal transfer means for transmitting data transfer instruction signals including signals representing the first instruction and signals representing the second instruction;

(ii) inhibit signal transmitting means for transmitting an inhibit signal to said data transfer instruction signal transmitting means to inhibit it from transmitting a first instruction;

(iii) decoding means connected to said data transfer instruction signal transfer means and said inhibit signal transmitting means for decoding the data transfer instruction signals and for enabling said inhibit signal transmitting means to transmit said inhibit signal in response to the receipt of said first instruction from said data transfer instruction signal transfer means;

(iv) first disabling means connected to its respective data transfer instruction signal transmitting means and said decoding means for disabling the respective decoding means when the connected data transfer instruction signal transmitting means transmits the first instruction; and (v) second disabling means connected to its respective inhibiting signal transmitting means and said data transfer instruction signal transfer means and responsive to the receipt of signals representing the second instruction from said data transfer instruction signal transfer means for disabling said inhibiting signal transmitting means to thereafter enable its respective data transfer instruction signal transmitting means to transmit signals representing the first instruction.

2. A data processing system as defined in claim 1 wherein each said first and second data means second disabling means includes a second decoding means connected to said data transfer instruction signal transfer means and to said inhibiting signal transmitting means, each said second decoding means being responsive to the second instruction for inhibiting said inhibiting signal transmitting means from transmitting said inhibiting signal to permit said data transfer instruction signal transmitting means to thereafter transmit the first instruction.

3. A data means for connection to a data processing system including a common bus including a memory, and means for transferring data and data transfer instruction signals which enable the transfer of data between said data means and the memory, said data transfer instruction signals representing a first instruction and signals representing a second instruction, said data means including:

(i) data transfer instruction signal transmitting means connected to said data transfer instruction signal transfer means for transmitting data transfer instruction signals including signals representing the first instruction and signals representing the second instruction;

(ii) inhibit signal transmitting means for transmitting an inhibit signal to said data transfer instruction signal transmitting means to inhibit it from transmitting a first instruction;

(iii) decoding means connected to said data transfer instruction signal transfer means and said inhibit signal transmitting means for decoding the data transfer instruction signals and for enabling said inhibit signal transmitting means to transmit said inhibit signal in response to the receipt of said first instruction from said data transfer instruction signal transfer means;

(iv) first disabling means connected to said data transfer instruction signal transmitting means and said decoding means for disabling said decoding means when the connected data transfer instruction signal transmitting means transmits the first instruction; and (v) second disabling means connected to said inhibiting signal transmitting means and said data transfer instruction signal transfer means and responsive to the receipt of signals representing the second instruction from said data transfer instruction signal transfer means for disabling said inhibiting signal transmitting means to thereafter enable its respective data transfer instruction signal transmitting means to transmit signals representing the first instruction.

4. A data means as defined in claim 3 wherein second disabling means includes a second decoding means connected to said data transfer instruction signal transfer means and to said inhibiting signal transmitting means, each said second decoding means being responsive to the second instruction for inhibiting said inhibiting signal transmitting means from transmitting said inhibiting signal to permit said data transfer instruction signal transmitting means to thereafter transmit the first instruction.

* * * * *